US011267379B2

(12) United States Patent
Abreu (10) Patent No.: US 11,267,379 B2
(45) Date of Patent: Mar. 8, 2022

(54) TEMPERATURE-CONTROLLED STROLLER

(71) Applicant: Manuel Abreu, Jersey City, NJ (US)

(72) Inventor: Manuel Abreu, Jersey City, NJ (US)

(*) Notice: Subject to any disclaimer, the term of this patent is extended or adjusted under 35 U.S.C. 154(b) by 105 days.

(21) Appl. No.: 16/829,706

(22) Filed: Mar. 25, 2020

(65) Prior Publication Data

US 2020/0223335 A1 Jul. 16, 2020

Related U.S. Application Data

(63) Continuation-in-part of application No. 15/900,899, filed on Feb. 21, 2018, now abandoned.

(60) Provisional application No. 62/461,253, filed on Feb. 21, 2017.

(51) Int. Cl.
*B62B 7/00* (2006.01)
*B60N 2/56* (2006.01)
*B62B 9/10* (2006.01)

(52) U.S. Cl.
CPC ......... *B60N 2/5628* (2013.01); *B60N 2/5642* (2013.01); *B62B 9/102* (2013.01); *B62B 2202/42* (2013.01); *B62B 2204/04* (2013.01)

(58) Field of Classification Search
CPC .... B62B 7/00; B62B 7/04; B62B 9/08; B60N 2/5628; B60N 2/286; B60N 2/2884
See application file for complete search history.

(56) References Cited

U.S. PATENT DOCUMENTS

| | | | |
|---|---|---|---|
| 3,193,322 A | 7/1965 | Hines | |
| 4,314,727 A | 2/1982 | Potts | |
| 6,127,655 A | 10/2000 | Humes et al. | |
| 6,139,046 A | 10/2000 | Aalund et al. | |
| 6,409,206 B1 | 7/2002 | Willrich | |
| 7,150,162 B1 | 12/2006 | Brunner | |
| 7,320,223 B1 | 1/2008 | Dabney et al. | |

(Continued)

OTHER PUBLICATIONS

"SmartBe, The Self-Propelling Baby Stroller With Climate Control & Brakes!", available on the Internet on Jul. 9, 2018 at https://www.youtube.com/watch?v=maUQAAfU44I.

(Continued)

*Primary Examiner* — Hau V Phan
(74) *Attorney, Agent, or Firm* — John H. Choi & Associates (57) ABSTRACT

A stroller having a frame, a seat on the frame for receiving a child and a heating/cooling system operably coupled to the seat. The heating/cooling system includes a single heating and cooling element proximate the seat. A reversible compressor is operably coupled to the single heating and cooling element. A first coil operably coupled to the compressor. A reversible expansion valve is operably coupled to the first coil. The reversible expansion valve is operably coupled to the single heating and cooling element. A refrigerant circulates through the single heating and cooling element, reversible compressor, first coil and reversible expansion valve. The heating/cooling system provides a first operating configuration for cooling the seat by having the refrigerant within the single heating and cooling element absorb heat, and a second operating configuration for heating the seat by having the refrigerant within the single heating and cooling element dissipate heat.

15 Claims, 9 Drawing Sheets

(56) References Cited

U.S. PATENT DOCUMENTS

| | | | |
|---|---|---|---|
| 7,461,892 B2* | 12/2008 | Bajic | A47C 7/72 |
| | | | 297/180.1 |
| 8,430,451 B1 | 4/2013 | Heinz | |
| 8,534,751 B2 | 9/2013 | Hei et al. | |
| 8,544,942 B2* | 10/2013 | Lazanja | H05B 1/028 |
| | | | 297/180.12 |
| 8,979,192 B2 | 3/2015 | Miller | |
| 9,044,867 B2* | 6/2015 | Rothschild | B62B 9/14 |
| 9,215,859 B2 | 12/2015 | Jakubowski | |
| 9,399,477 B2* | 7/2016 | Iftinca | B62B 9/102 |
| 9,446,779 B2* | 9/2016 | Rembisz | B62B 7/068 |
| 9,452,769 B1 | 9/2016 | Williams et al. | |
| 2005/0016800 A1 | 8/2005 | Darland | |
| 2006/0273612 A1* | 12/2006 | Choi | B62B 9/26 |
| | | | 296/97.21 |
| 2008/0084040 A1 | 4/2008 | McGowan | |
| 2008/0272102 A1* | 11/2008 | Farrington | H05B 3/42 |
| | | | 219/201 |
| 2009/0261137 A1 | 10/2009 | Nooshin | |
| 2013/0162396 A1 | 6/2013 | Yang | |
| 2015/0115669 A1* | 4/2015 | Kagan | B60N 2/286 |
| | | | 297/180.12 |
| 2016/0076830 A1 | 3/2016 | Repp | |
| 2016/0101803 A1* | 4/2016 | Ahlemeier | B62B 9/08 |
| | | | 180/167 |
| 2016/0332542 A1* | 11/2016 | Cohen | B60N 2/2884 |
| 2018/0236913 A1* | 8/2018 | Abreu | B62B 9/142 |
| 2019/0084606 A1* | 3/2019 | Acheampong | B62B 7/04 |

OTHER PUBLICATIONS

"Titan USB Tower Crossflow Cooling Fan for Car, Baby Stroller, Office, Personal Use", available on the Internet on Jul. 9, 2018 at https://www.amazon.com/TITAN-Crossflow-Cooling-Stroller-Personal/dp/B013WKXE52.

"Clip-On Table, 1-1/2" Fan, 120V", available on the Internet on Jul. 9, 2018 at https://www.grainger.com/product/AIR-KING-Clip-On-Table-1EFV9.

"Geleeo Baby Stroller Cooling Gel Liner", available on the Internet on Jul. 9, 2018 at https://www.amazon.com/Geleeo-Baby-Stroller-Cooling-Liner/dp/B00JKZPJIE.

"The Noggle—Making the Backseat Cool Again—Vehicle Air Conditioning System To Keep Your Baby/Children Cool and Comfortable When Traveling in the Car—Works with Most Vehicles", available on the Internet on Jul. 9, 2018 at https://www.amazon.com/Noggle-Backseat-Conditioning-Comfortable-Traveling/dp/B00LXT23RA?th=1.

"This air filter for strollers creates a barrier of clean air for your baby", available on the Internet on Jul. 9, 2018 at https://www.optimistdaily.com/2017/09/this-air-filter-for-strollers-creates-a-barrier-of-clean-air-for-your-baby.

* cited by examiner

TEMPERATURE-CONTROLLED STROLLER

CROSS-REFERENCE TO RELATED APPLICATION

This application is a continuation-in-part application of U.S. application Ser. No. 15/900,899, filed Feb. 21, 2018, which claims priority to U.S. Provisional Application No. 62/461,253, filed on Feb. 21, 2017, which are incorporated by reference in their entireties.

FIELD

The present disclosure relates to a stroller, in particular to a temperature-controlled stroller.

BACKGROUND

Baby strollers are known which leave the baby therein exposed to the local environment and climate. Such environmental conditions and climate may be too hot or too cold for the baby, and thus may be harmful to the baby due to the baby's still-developing immune system.

A need exists for an improved baby stroller with temperature control.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In general, the present invention provides a stroller comprising a frame, a seat on the frame for receiving a child and a temperature-controllable element substantially adjacent to the seat for controlling the temperature of an environment of the child.

In one aspect, the present invention provides a stroller comprising: a frame; a seat on the frame for receiving a child; and a heating/cooling system operably coupled to the seat. The heating/cooling system comprises: a single heating and cooling element proximate the seat; a reversible compressor operably coupled to the single heating and cooling element; a first coil operably coupled to the compressor; a reversible expansion valve operably coupled to the first coil, the reversible expansion valve operably coupled to the single heating and cooling element; and a refrigerant circulating through the single heating and cooling element, reversible compressor, first coil and reversible expansion valve. The heating/cooling system comprises a first operating configuration for cooling the seat. The first operating configuration has a first heat transfer cycle comprising: the refrigerant in an at least a partial gas form compressed by the compressor causing a phase change of the refrigerant to an at least partial liquid form; the at least partial liquid refrigerant circulated through the first coil whereby heat is dissipated from the refrigerant; the at least partial liquid refrigerant circulated through the single heating and cooling element whereby heat is absorbed by the refrigerant causing the seat to be cooled while the refrigerant changes phases to an at least partial gas form; and the at least partial gas refrigerant is circulated to the compressor and the first heat transfer cycle is repeated. The heating/cooling system also comprises a second operating configuration for heating the seat. The second operating configuration having a second heat transfer cycle comprises: the refrigerant in an at least a partial liquid form circulated through the first coil whereby heat is absorbed by the refrigerant causing the refrigerant to change phases to an at least partial gas form; the at least partial gas refrigerant circulated through the compressor causing a phase change of the refrigerant to an at least partial liquid form; the at least partial liquid refrigerant is circulated through the single heating and cooling element whereby heat is dissipated from the refrigerant to the seat causing the seat to be heated; and the at least partial liquid refrigerant is circulated to the first coil and the second heat transfer cycle is repeated.

In another aspect, the present invention provides a stroller comprising: a frame; a seat on the frame for receiving a child; and a heating/cooling system operably coupled to the seat. The heating/cooling system comprises: a single heating and cooling element proximate the seat; a reversible compressor operably coupled to the single heating and cooling element; a first coil operably coupled to the compressor; a reversible expansion valve operably coupled to the first coil, the reversible expansion valve operably coupled to the single heating and cooling element; a refrigerant circulating through the single heating and cooling element, reversible compressor, first coil and reversible expansion valve; and a first fan proximate the single heating and cooling element. The fan produces an airflow to promote the single heating and cooling element in absorbing heat in a first operating configuration and the fan produces airflow to dissipate heat from the single heating and cooling element in a second operating configuration.

In yet another aspect, the present invention provides a stroller comprising: a frame; a seat on the frame for receiving a child; and a heating/cooling system operably coupled to the seat. The heating/cooling system comprises: a single heating and cooling element proximate the seat; a reversible compressor operably coupled to the single heating and cooling element; a first coil operably coupled to the compressor; a reversible expansion valve operably coupled to the first coil and the single heating and cooling element; and a refrigerant circulating through the single heating and cooling element, reversible compressor, first coil and reversible expansion valve.

BRIEF DESCRIPTION OF DRAWINGS

The following detailed description of presently preferred embodiments of the invention will be better understood when read in conjunction with the appended drawings. For purposes of illustrating the invention, there are shown in the drawings embodiment(s) which are presently preferred. It should be understood, however, that the invention is not limited to the precise arrangements and instrumentalities shown.

In the drawings.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left are used to describe the accompanying figures. The terminology includes the words above specifically mentioned, derivatives thereof, and words of similar import.

The present invention is for a new and unique temperature-controlled stroller, and provides numerous advantages that are not present in existing strollers. With the present invention, the temperature of the seating area of a stroller is controlled thus providing comfort to a passenger in a stroller.

Referring to the figures, generally, the present invention provides a temperature-controlled stroller 1 that has the ability to heat and cool an area where a child is seated. Heating and cooling elements are located below a liner of a backrest of a stroller seat, which is governed by a temperature controller mounted at a base near back wheels of the stroller.

The controller includes necessary electronic components to heat or cool the elements, similar to temperature-controlled seats of an automobile. The controller has a bank of rechargeable batteries that are rechargeable through an outlet provided in the controller. The stroller also has a solar panel mounted near the top of the unit that may collect sunlight and help to recharge the batteries. The temperature is controlled manually or by an application found on a smart phone connected to the controller via Bluetooth.

Referring to FIGS. 1-5, several views of the stroller 1 of the present invention are shown with the stroller 1 in an expanded state. The stroller 1 includes a frame 2 supported by at least one front wheel 4 and at least two rear wheels 6. A bottom portion of the frame 2 includes a base 8 positioned between the wheels 4, 6, which can be used to store items. The frame 2 is configured such that the stroller is capable of being folded to a compact folded state (not shown). The frame 2 is preferably constructed of a light-weight metal or high-strength plastic.

Figure 1:
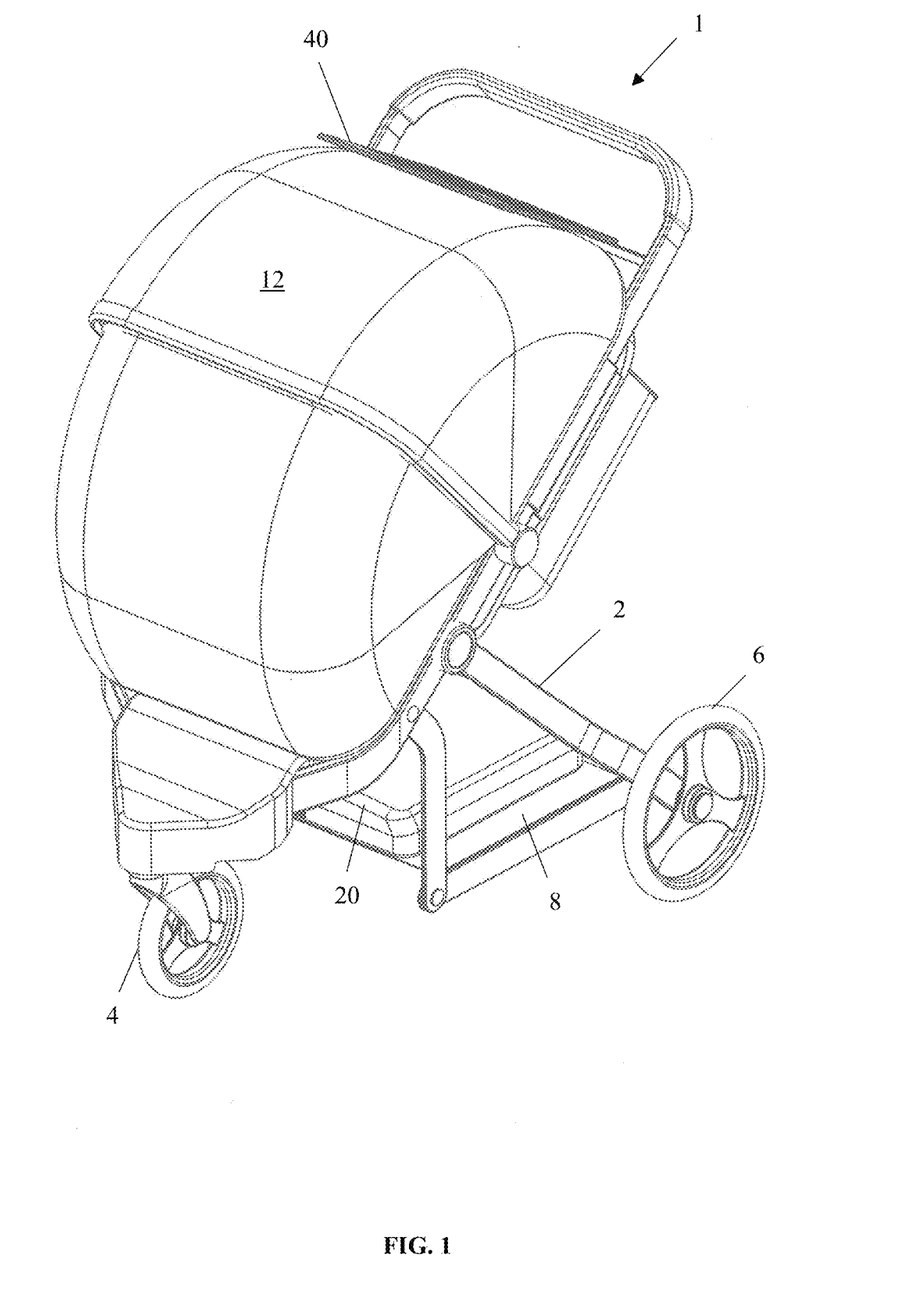
FIG. 1 is a front perspective view of an embodiment of a stroller of the present invention.
Figure 2:
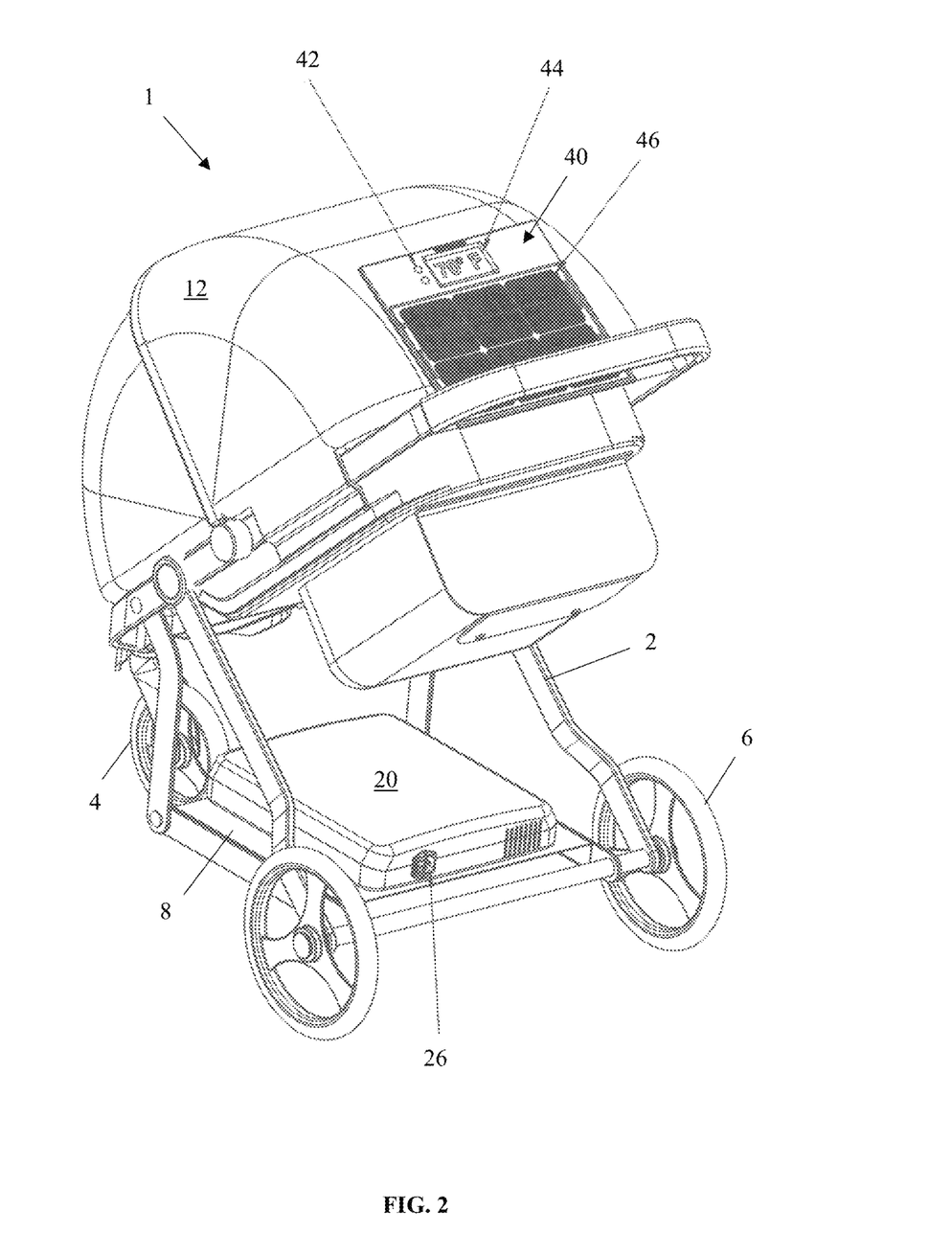
FIG. 2 is a rear perspective view of the stroller of FIG. 1.
Figure 3:
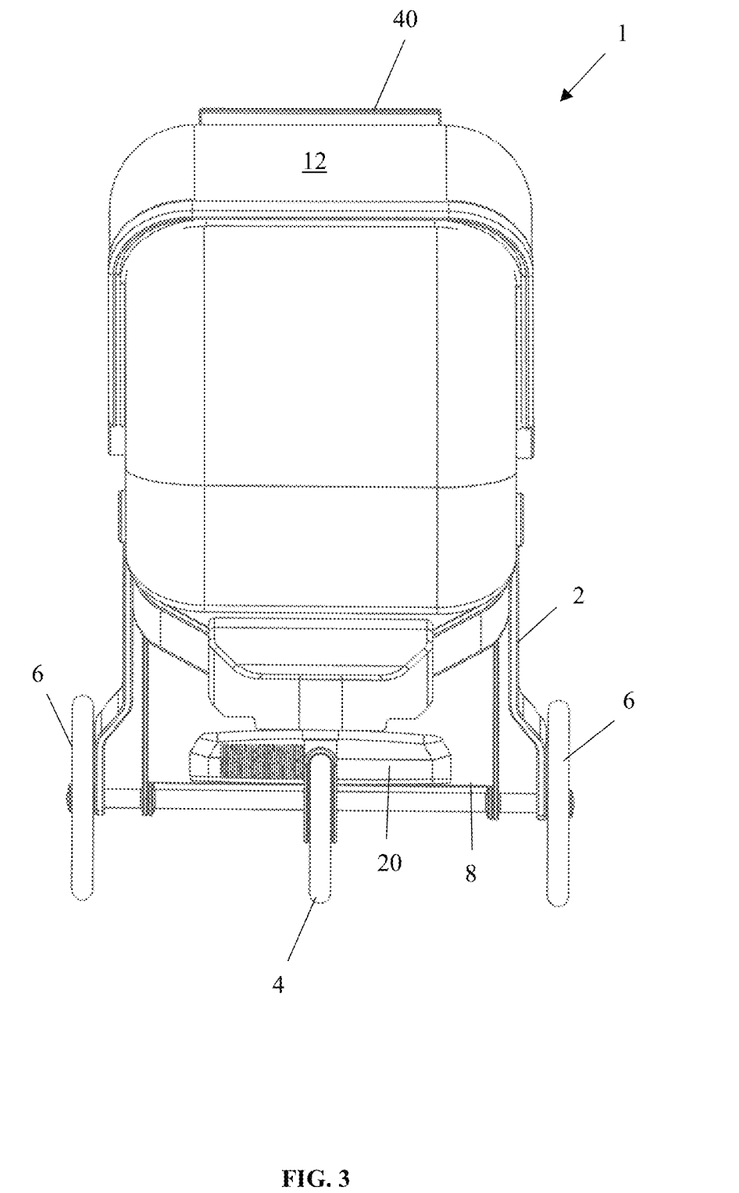
FIG. 3 is front view of the stroller of FIG. 1.
Figure 4:
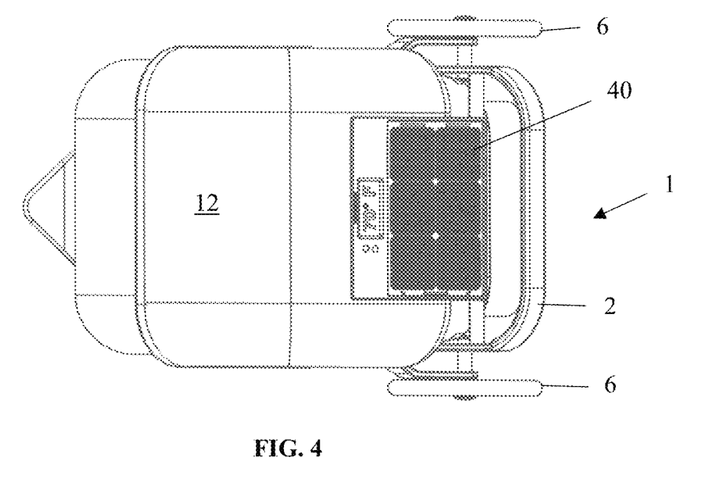
FIG. 4 is a top view of the stroller of FIG. 1.
Figure 5:
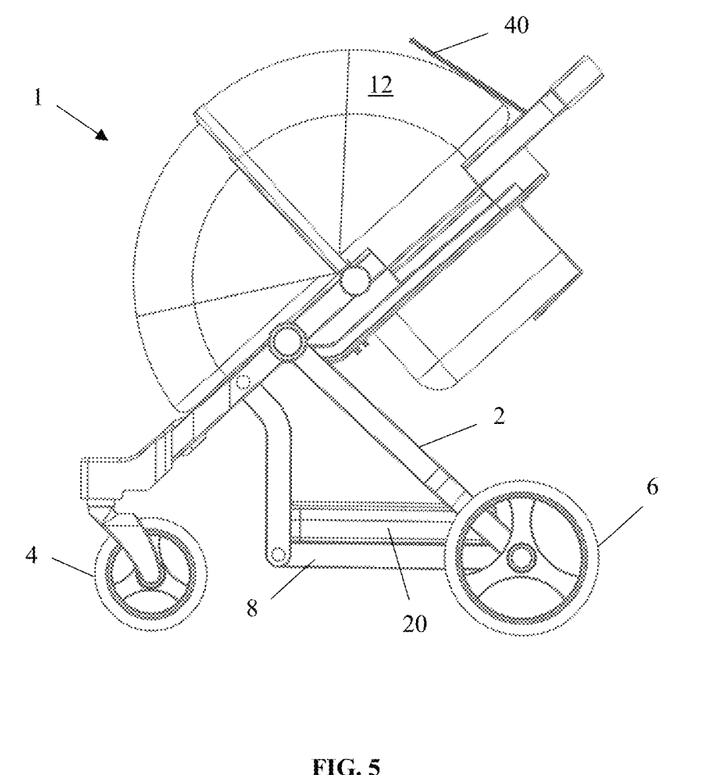
FIG. 5 is a side view of the stroller of FIG. 1.
Figure 6:
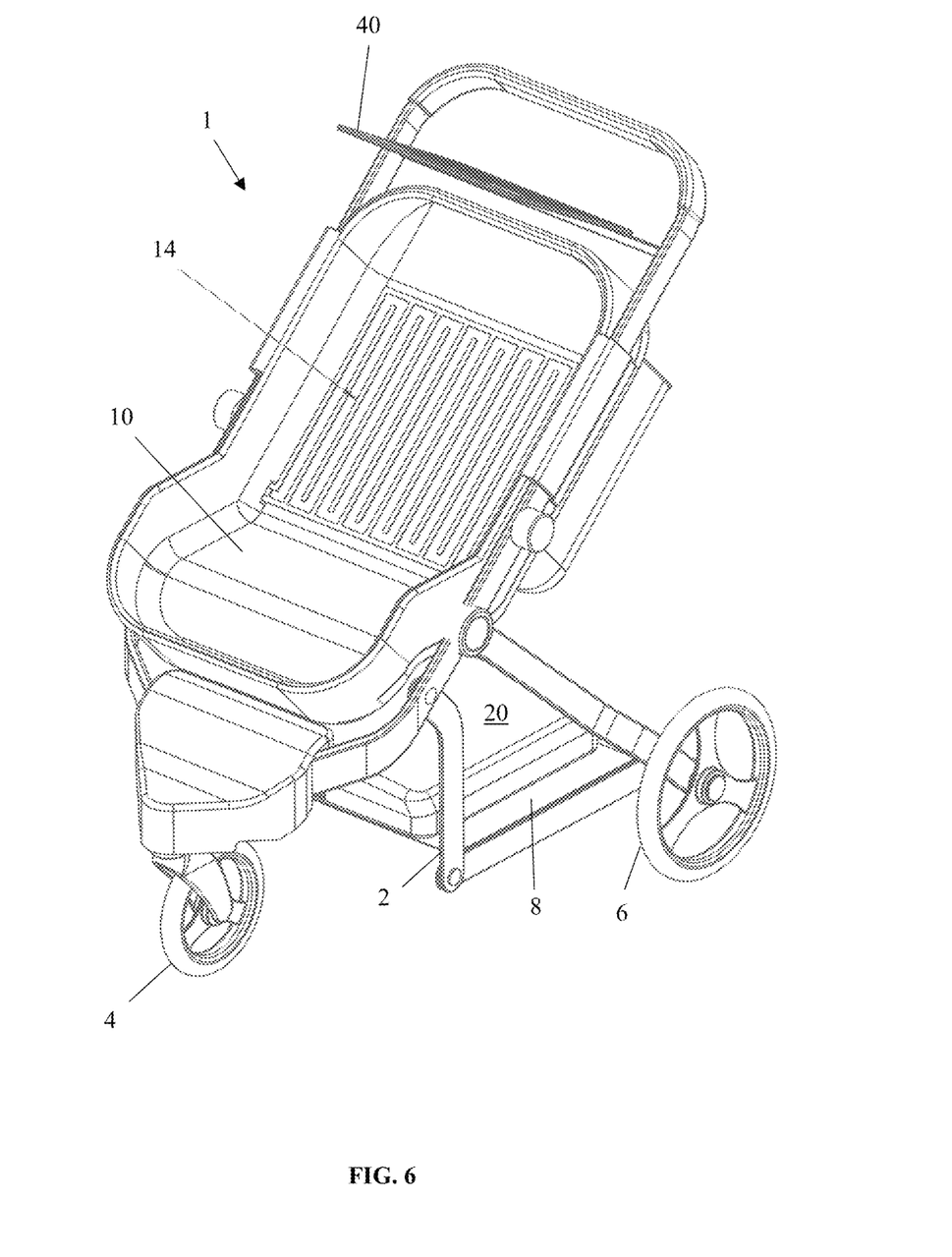
FIG. 6 is a perspective view of the stroller of FIG. 1 showing an embodiment of heating and cooling elements.

Referring to FIG. 6, the stroller 1 includes a seat 10, which is supported by the frame 2. The seat 10 is provided with a removable cover 12, as shown in FIGS. 1-5. The cover 12 could be completely removed a shown in FIG. 6 or foldable, and could be folded into one or more sections in one or more directions. The cover 12 is preferably constructed of a flexible, water-resistant material such as but not limited to vinyl, nylon, polyester or a combination thereof. In one embodiment, the cover 12 is opened by spring action and held closed by an electromagnet. This can enable the cover 12 to be opened electronically. In addition, as a safety measure, a loss of power disables the magnet and the cover 12 opens by spring action.

Referring again to FIG. 6, the seat 10 also includes a seat cover (not shown), and at least one heating/cooling element 14 is included on a back portion of the seat underneath the seat cover. The seat cover could be an air permeable material so that heat (hot or cold) is efficiently transferred through the seat cover while protecting the passenger from excessive temperatures from the heating/cooling element 14.

In one embodiment, the heating/cooling element 14 is a continuous hollow tube for transferring air, liquid or gas. In this embodiment, if heat is desired a hot or warm material is transferred through the tube, and if air-conditioning is desired a cold material is transferred through the tube. As such, the stroller 1 could be provided with removable and interchangeable heating/cooling elements. For example, during cold seasons, the heating/cooling elements 14 could include antifreeze liquid for heating and during warm seasons a different heating/cooling element 14 having, for example, a refrigerant like Freon, could be installed for cooling. The refrigerant gas could be other hydrofluorocarbons or HFCs, such as R-410A, hydrochlorofluorocarbons or HCFCs, like R-22, and hydrocarbons, such as R-290 and R-600A. Alternatively, the heating/cooling element 14 could be configured to include dual tubes or conduits extending side-by-side to accommodate each option.

Figure 13:
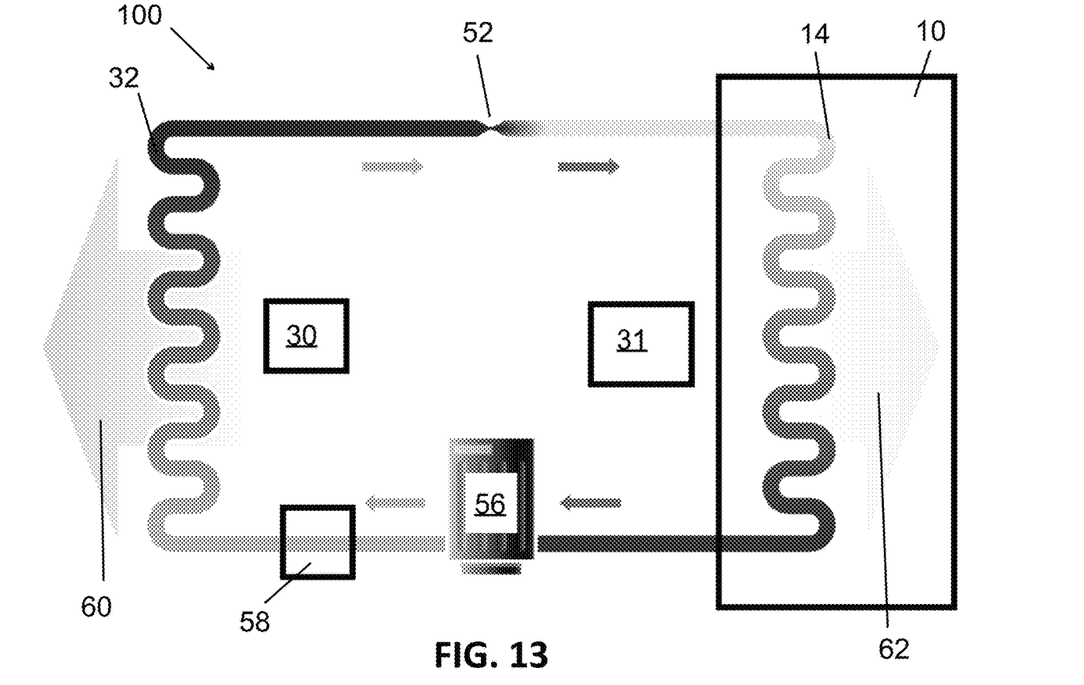
FIG. 13 is a schematic view of a heating/cooling system of the present invention in a cooling cycle.
Figure 14:
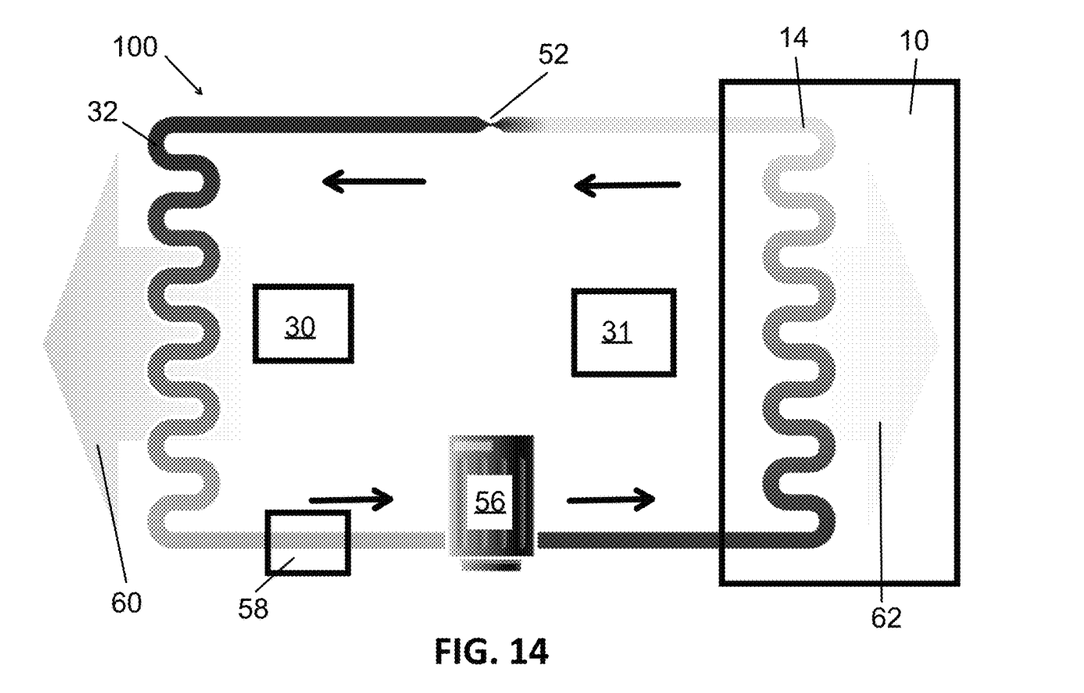
FIG. 14 is a schematic view of a heating/cooling system of the present invention in a heating cycle.

In another embodiment, as shown in FIGS. 13 and 14, and described in detail below, the heating/cooling element 14 is a single conduit with a single refrigerant for both cooling and heating functions.

In another embodiment, the heating/cooling element 14 includes a continuous insulated electrical coil arranged in a substantially flat and planar configuration. In this embodiment, the electrical coil is heated by electrical power to provide heat to the passenger.

In a further embodiment, the electrical coil could be insulated from but circumscribed by a hollow tube such that when heat is desired the electrical coil is heated and when air-conditioning is desired cool air or gas is circulated through the insulated hollow portion.

Alternatively, the heating/cooling element 14 could comprise multiple tubes and/or coils, instead of one continuous tube or coil, for circulating warm or cold materials and/or electrical heating elements therethrough.

Referring to FIGS. 8-12, the heating/cooling element 14 is operably coupled to a controller 20. That is, electrical wires and/or conduits (not shown) are connected to and from the heating/cooling element 14 and the controller 20, which is positioned on the base 8 as shown in FIGS. 1-6. The electrical wires and/or conduits are attached to the frame 2 such that the connection therebetween is not impeded when the stroller is in an expanded state and a folded state (not shown).

Referring again to FIGS. 8-12, the controller 20 includes a case 22, preferably made of molded plastic, which is separable for access to an inner portion thereof. The controller 20 includes at least one rechargeable battery 24 for powering a micro-processor 28 and a first fan 30 within the controller 20. Other devices (described below) could be powered by the battery 24 as well. A heat sink 32 is provided for air-conditioning, which is described in more detail below. The heat sink 32 and first fan 30 could also be positioned outside the controller 20. The batteries 24 are also operably coupled to a power plug 26 for recharging.

Figure 7:
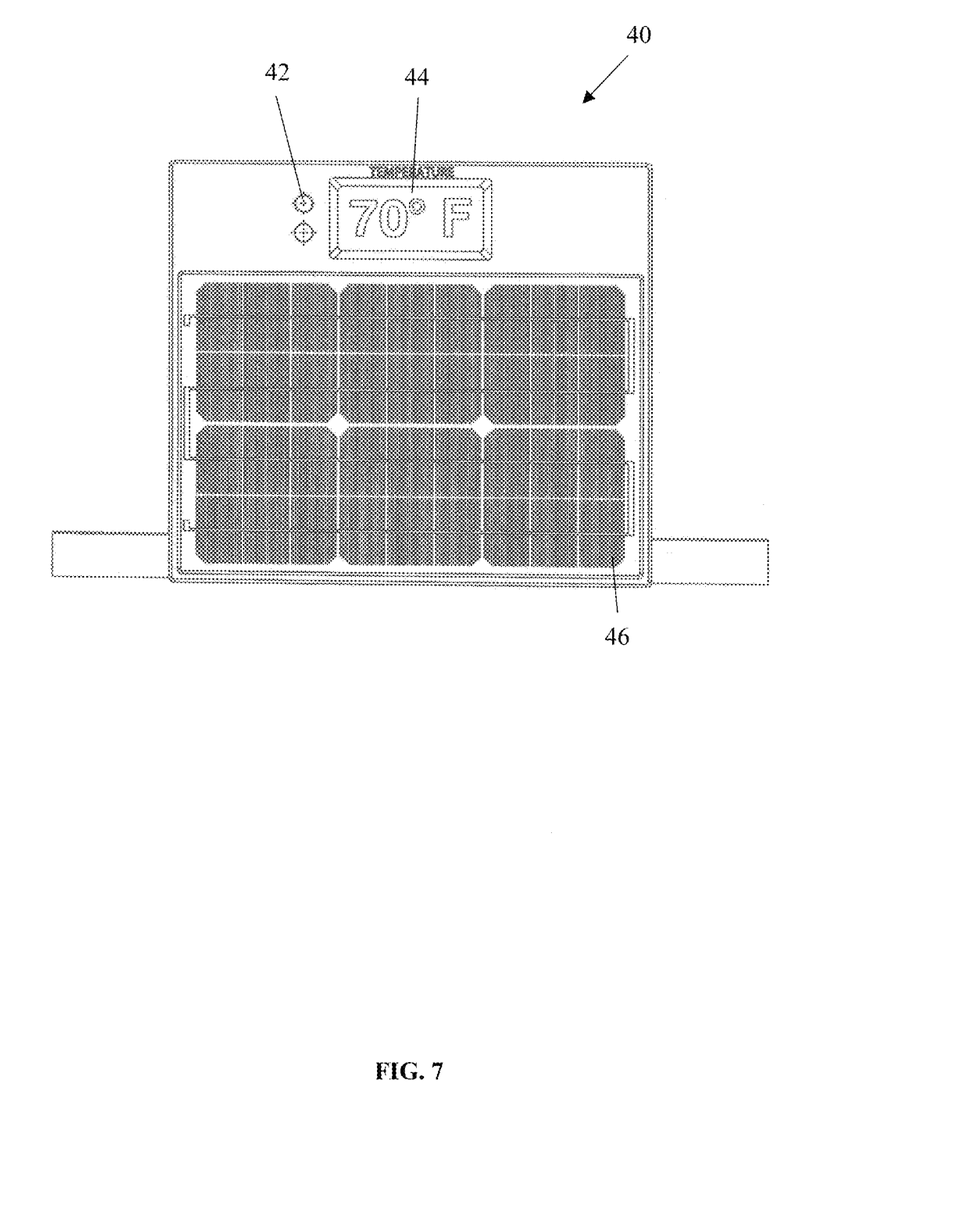
FIG. 7 is a top view of an embodiment of a control panel of the stroller of the present invention.
Figure 8:
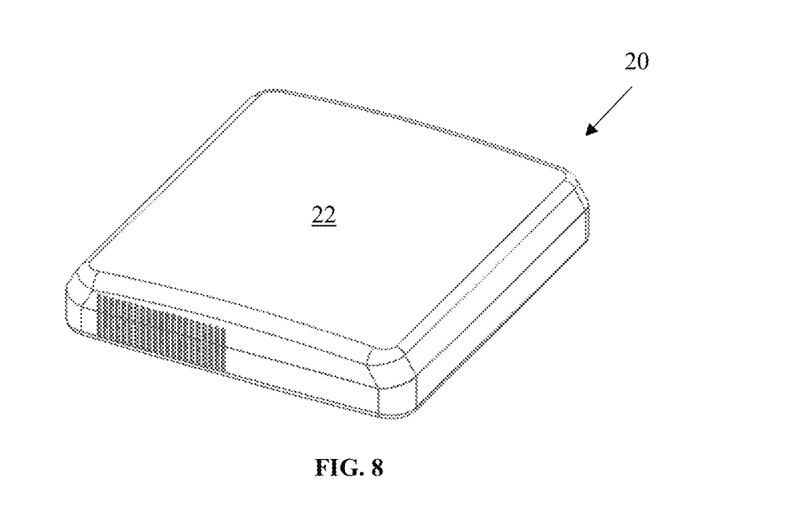
FIG. 8 is a top perspective view of an embodiment of a temperature controller of the present invention.
Figure 9:
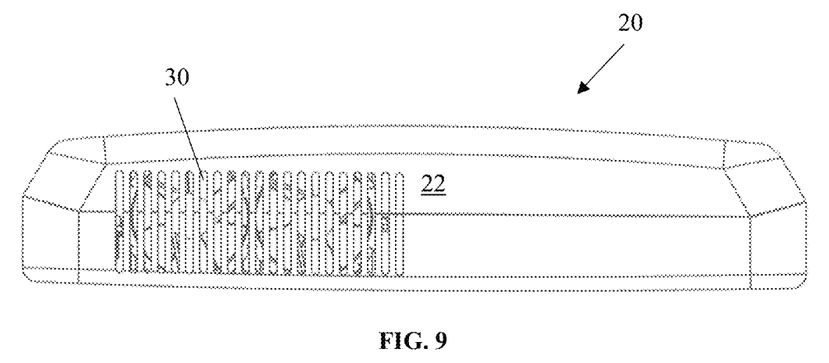
FIG. 9 is a rear view of the temperature controller of FIG. 8.
Figure 10:
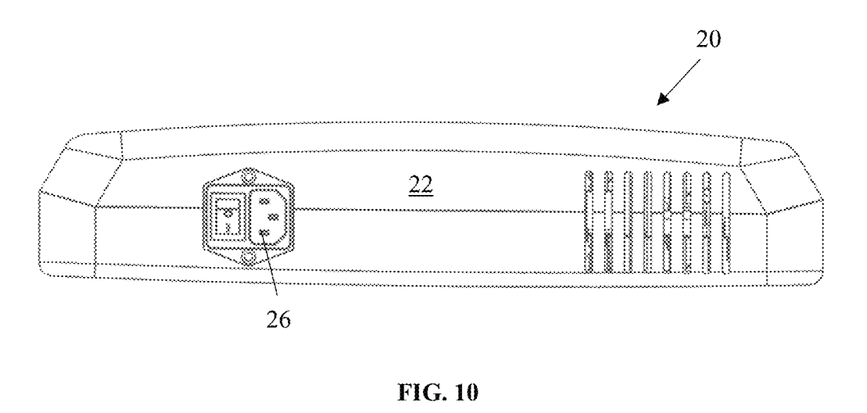
FIG. 10 is a front view of the temperature controller of FIG. 8.
Figure 11:
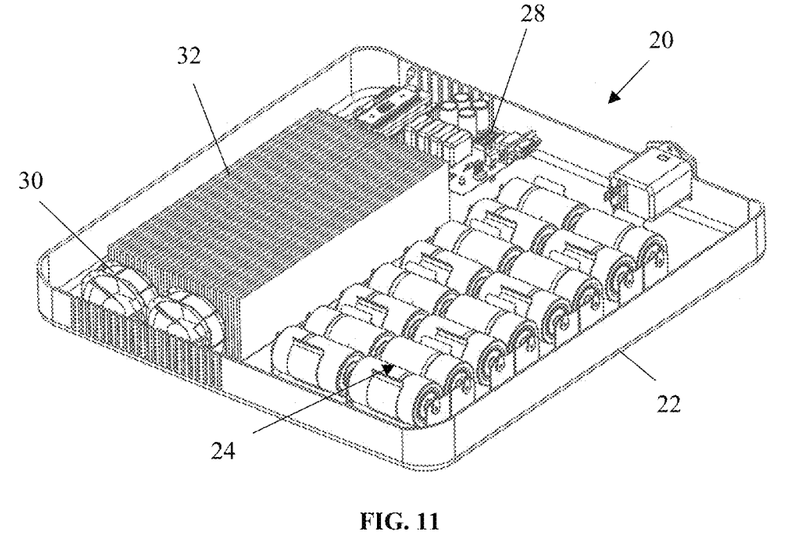
FIG. 11 is a top perspective view of internal components of the temperature controller of FIG. 8.
Figure 12:
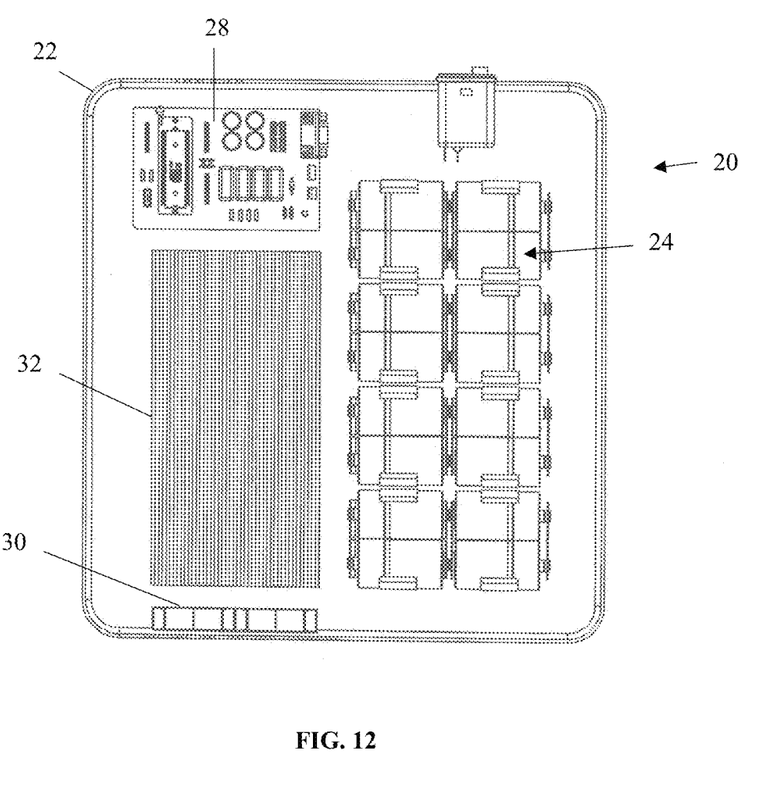
FIG. 12 is a top view of the internal components of the temperature controller shown in FIG. 11.

Referring to FIG. 7, the controller 20 is operably coupled to a control panel 40 which is mounted to an upper portion of the frame 2, as shown in FIGS. 1-6. In this embodiment, the control panel 40 includes on/off switches 42 as well as a temperature gauge 44. In other embodiments, the control panel 40 could include other functions such as temperature control so that the temperature of the seat 10 could be set to a desired temperature, a power indicator to advise the user of remaining power, and a speaker to audibly alert the user of temperature changes. The control panel 40 also includes a solar panel 46 which is operably coupled to the batteries 24 of the controller 20. Thus, the batteries 24 are recharged via solar energy when the solar panel 46 is exposed to light.

In another embodiment, the controller 20 and/or control panel 40 is operably coupled to an external device such as a smart phone (not shown) by known means such as Bluetooth technology such that the temperature of the seat 10 could be controlled remotely. In addition, the external device could display other information such as those described above.

As described above, heating and cooling can be accomplished in a number of different ways. In operation, in one embodiment, as shown in FIGS. 13 and 14, a heating/cooling system 100 is provided with a single heating/cooling element 14 within or adjacent to the seat 10, which functions as both a cooling element in a first operating configuration and a heating element in a second operating configuration, to alternately cool or heat the seat 10 under the control of the controller 20. That is, the single heating/cooling element 14 is a single conduit used for both heating and cooling the seat 10. As shown in FIGS. 13 and 14, the heat sink 32 is connected to a reversible expansion valve 52, which is in turn connected to the single heating/cooling element 14, and then to a reversible compressor 56. A reversible pump 58 is optionally included to facilitate the flow of a liquid and/or gas through the heating/cooling system 100. As described above, the first fan 30 is positioned adjacent to the heat sink 32. In addition, a second fan 31 is positioned adjacent to the single heating/cooling element 14.

Referring to FIG. 13, in a first operating configuration for cooling the seat 10, a refrigerant gas, such as Freon, is compressed by a reversible compressor 56, and undergoes a phase change to a high-temperature liquid or partial liquid, which is then circulated in a clockwise direction. The compressed refrigerant liquid at least partially condenses as it passes through the heat sink or first coil 32, which acts as a condenser or condensing coil, and dissipates heat to the ambient surroundings optionally aided by the first fan 30, which creates a first airflow 60. The cool refrigerant liquid then travels through the expansion valve 52, which controls the flow of the cool liquid refrigerant and de-pressurizes the cool liquid into the heating/cooling element 14. Here, the heating/cooling element or second coil 14 acts as an evaporator or evaporator coil which absorbs heat from the seat 10, i.e., cool air is discharged. Optionally, the second fan 31 could be provided to accelerate heat transfer by creating a second airflow 62. As a result of heat absorption the refrigerant undergoes a phase change from a cool liquid to a warm or hot gas/vapor or partial gas/vapor. The refrigerant gas then travels to the compressor 56 to repeat the cooling cycle.

Referring to FIG. 14, in a second operating configuration for heating the seat 10, the flow of the refrigerant is reversed, i.e., counterclockwise. Here, refrigerant gas or partial gas is compressed by the reversible compressor 56 and undergoes a phase change to warm/hot liquid or partial liquid. The warm or hot liquid travels through the single heating/cooling element or second coil 14 located in or adjacent to the seat 10 during which time heat is dissipated to the seat 10. The single heating/cooling element 14 acts as a condenser or condensing coil and the liquid refrigerant at least partially condenses. The reversible expansion valve 52 de-pressurizes the refrigerant and the cooler liquid then enters the heat sink or first coil 32, which acts as an evaporator, where heat is absorbed by the refrigerant, i.e., cool air is discharged, to undergo a phase change to warmer gas or partial gas. The warmer gas then enters the compressor 56 to repeat the heating cycle. The fans 30, 31 could be used to further aid in the heating process. For example, the second fan 31 could be used to further dissipate heat from the refrigerant to the seat 10 and the first fan 30 could be used to aid in the evaporating stage in the heat sink 32 to absorb heat from the ambient air. Thus, in the second operating configuration the heating/cooling system 100 acts as a heat pump, or alternatively as a reverse cycle air conditioner or reverse cycle refrigerator, to produce heating instead of cooling of the seat 10. As a heat pump, the heating/cooling system 100 is significantly more energy-efficient than electric resistance heating.

Referring to FIGS. 13 and 14, the compressor 56 may include an internal pump. Alternatively, if the compressor 56 does not include a pump or the heating/cooling system 100 requires better circulation of the refrigerant, the single heating/cooling system 100 may include or be connected to a separate pump 58 to assist in the flow of the refrigerant.

The various components of the heating/cooling system 100, e.g., the compressor 56 and expansion valve 52, could be housed underneath the seat 10 on or around the base 8 and the coils of the system 100 running between the first coil 32 and second coil 14 could be mounted to a lower section of the frame 2.

The heating/cooling system 100 is operably coupled with the controller 20 so that a user can control heating and cooling of the seat 10 via the control panel 40. Various components of the heating/cooling system 100 which require a power source, namely, the compressor 56, pump 58, expansion valve 52 and fans 30, 31 are collectively powered through the controller 20 via electric power. Alternatively, some or all of the components of the heating/cooling system 100 could be powered separately.

In an alternative embodiment, for electric coil heating, electricity is transferred to the electric coils from the controller 20 and the seat 10 is heated. Alternatively, a heat transfer material such as water or oil can be heated via electrical power by electric coils (not shown) at or near the controller 20 or by an electrically heated heatsink 20 and then circulated through a conduit by a pump (not shown) to the heating/cooling element 14 and returned to the controller 20 for re-heating and circulation.

The present invention may be embodied in other specific forms without departing from its spirit or essential characteristics. The described embodiments are to be considered in all respects only as illustrative and not restrictive. The scope of the invention will be, therefore, indicated by claims rather than by the foregoing description. All changes which come within the meaning and range of equivalency of the claims are to be embraced within their scope.

What is claimed is:

1. A stroller comprising:
   a frame;

a seat on the frame for receiving a child; and
a heating/cooling system operably coupled to the seat, the heating/cooling system comprising:
a single heating and cooling element proximate the seat;
a reversible compressor operably coupled to the single heating and cooling element;
a first coil operably coupled to the compressor;
a reversible expansion valve operably coupled to the first coil, the reversible expansion valve operably coupled to the single heating and cooling element; and
a refrigerant circulating through the single heating and cooling element, reversible compressor, first coil and reversible expansion valve;
wherein the heating/cooling system comprises a first operating configuration for cooling the seat, the first operating configuration having a first heat transfer cycle comprising:
the refrigerant in an at least a partial gas form compressed by the compressor causing a phase change of the refrigerant to an at least partial liquid form;
the at least partial liquid refrigerant circulated through the first coil whereby heat is dissipated from the refrigerant;
the at least partial liquid refrigerant circulated through the single heating and cooling element whereby heat is absorbed by the refrigerant causing the seat to be cooled while the refrigerant changes phases to an at least partial gas form; and
the at least partial gas refrigerant is circulated to the compressor and the first heat transfer cycle is repeated; and
wherein the heating/cooling system comprises a second operating configuration for heating the seat, the second operating configuration having a second heat transfer cycle comprising:
the refrigerant in an at least a partial liquid form circulated through the first coil whereby heat is absorbed by the refrigerant causing the refrigerant to change phases to an at least partial gas form;
the at least partial gas refrigerant circulated through the compressor causing a phase change of the refrigerant to an at least partial liquid form;
the at least partial liquid refrigerant is circulated through the single heating and cooling element whereby heat is dissipated from the refrigerant to the seat causing the seat to be heated; and
the at least partial liquid refrigerant is circulated to the first coil and the second heat transfer cycle is repeated.

2. The stroller of claim 1, wherein the single heating and cooling element is positioned within the seat.

3. The stroller of claim 1, further comprising a fan proximate the first coil, the fan producing an airflow to dissipate heat from the first coil in the first operating configuration and the fan producing an airflow to promote the first coil in absorbing heat in the second operating configuration.

4. The stroller of claim 1, further comprising a fan proximate the single heating and cooling element, the fan producing an airflow to promote the single heating and cooling element in absorbing heat in the first operating configuration and the fan producing airflow to dissipate heat from the single heating and cooling element in the second operating configuration.

5. A stroller comprising:
a frame;
a seat on the frame for receiving a child; and
a heating/cooling system operably coupled to the seat, the heating/cooling system comprising:
a single heating and cooling element proximate the seat;
a reversible compressor operably coupled to the single heating and cooling element;
a first coil operably coupled to the compressor;
a reversible expansion valve operably coupled to the first coil, the reversible expansion valve operably coupled to the single heating and cooling element;
a refrigerant circulating through the single heating and cooling element, reversible compressor, first coil and reversible expansion valve;
a first fan proximate the single heating and cooling element, the fan producing an airflow to promote the single heating and cooling element in absorbing heat in a first operating configuration and the fan producing airflow to dissipate heat from the single heating and cooling element in a second operating configuration and
a second fan proximate the first coil, the second fan producing an airflow to dissipate heat from the first coil in the first operating configuration and the fan producing an airflow to promote the first coil in absorbing heat in the second operating configuration.

6. The stroller of claim 5, wherein the first operating configuration having a heat transfer cycle comprising:
the refrigerant in an at least a partial gas form compressed by the compressor causing a phase change of the refrigerant to an at least partial liquid form;
the at least partial liquid refrigerant circulated through the first coil whereby heat is dissipated from the refrigerant;
the at least partial liquid refrigerant circulated through the single heating and cooling element whereby heat is absorbed by the refrigerant causing the seat to be cooled while the refrigerant changes phases to an at least partial gas form; and
the at least partial gas refrigerant is circulated to the compressor and the heat transfer cycle is repeated.

7. The stroller of claim 5, wherein the second operating configuration having a heat transfer cycle comprising:
the refrigerant in an at least a partial liquid form circulated through the first coil whereby heat is absorbed by the refrigerant causing the refrigerant to change phases to an at least partial gas form;
the at least partial gas refrigerant circulated through the compressor causing a phase change of the refrigerant to an at least partial liquid form;
the at least partial liquid refrigerant is circulated through the single heating and cooling element whereby heat is dissipated from the refrigerant to the seat causing the seat to be heated; and
the at least partial liquid refrigerant is circulated to the first coil and the heat transfer cycle is repeated.

8. The stroller of claim 5, wherein the single heating and cooling element is positioned within the seat.

9. The stroller of claim 5, further comprising a controller for controlling the heating/cooling system to selectively heat and cool the seat.

10. A stroller comprising:
a frame;
a seat on the frame for receiving a child; and
a heating/cooling system operably coupled to the seat, the heating/cooling system comprising:
a single heating and cooling element proximate the seat;
a reversible compressor operably coupled to the single heating and cooling element;

a first coil operably coupled to the compressor;

a reversible expansion valve operably coupled to the first coil, the reversible expansion valve operably coupled to the single heating and cooling element;

a refrigerant circulating through the single heating and cooling element, reversible compressor, first coil and reversible expansion valve;

a first fan proximate the first coil, the fan producing an airflow to dissipate heat from the first coil in the first operating configuration and the fan producing an airflow to promote the first coil in absorbing heat in the second operating configuration; and a second fan proximate the single heating and cooling element, the fan producing an airflow to promote the single heating and cooling element in absorbing heat in the first operating configuration and the fan producing airflow to dissipate heat from the single heating and cooling element in the second operating configuration;

wherein the heating/cooling system comprises a first operating configuration for cooling the seat, the first operating configuration having a first heat transfer cycle comprising:

the refrigerant in an at least a partial gas form compressed by the compressor causing a phase change of the refrigerant to an at least partial liquid form;

the at least partial liquid refrigerant circulated through the first coil whereby heat is dissipated from the refrigerant;

the at least partial liquid refrigerant circulated through the single heating and cooling element whereby heat is absorbed by the refrigerant causing the seat to be cooled while the refrigerant changes phases to an at least partial gas form; and the at least partial gas refrigerant is circulated to the compressor and the heat transfer cycle is repeated; and wherein the heating/cooling system comprises a second operating configuration for heating the seat, the second operating configuration having a second heat transfer cycle comprising:

the refrigerator in an at least a partial liquid form circulated through the first coil whereby heat is absorbed by the refrigerant causing the refrigerant to change phases to an at least partial gas form;

the at least partial gas refrigerant circulated through the compressor causing a phase change of the refrigerant to an at least partial liquid form;

the at least partial refrigerant is circulated through the single heating and cooling element whereby heat is dissipated from the refrigerant to the seat causing the seat to be heated;

the at least partial liquid refrigerant is circulated to the first coil and the heat transfer cycle is repeated.

11. The stroller of claim 10, wherein the single heating and cooling element is positioned within the seat.

12. The stroller of claim 10, further comprising a pump for aiding circulation of the refrigerant within the heating/cooling system.

13. The stroller of claim 10, further comprising a controller for controlling the heating/cooling system to selectively heat and cool the seat.

14. The stroller of claim 13, further comprising a power source for providing electrical power to the controller.

15. The stroller of claim 14, wherein the power source is a solar panel.

* * * * *